United States Patent [19]

Egan

[11] Patent Number: 4,609,478
[45] Date of Patent: Sep. 2, 1986

[54] SULFONATED ALKYL GLUCOSIDES AND USE THEREOF IN OIL RECOVERY

[75] Inventor: Philip A. Egan, Asheville, N.C.

[73] Assignee: Olin Corporation, Cheshire, Conn.

[21] Appl. No.: 581,679

[22] Filed: Feb. 21, 1984

[51] Int. Cl.⁴ .................... E21B 43/22; C07H 15/10
[52] U.S. Cl. ....................... 252/8.55 D; 536/4.1; 536/122
[58] Field of Search ............ 536/1.1, 4.1, 122; 252/8.55 D

[56] References Cited

U.S. PATENT DOCUMENTS

| | | |
|---|---|---|
| 3,468,377 | 9/1969 | Dunlap et al. |
| 3,506,070 | 4/1970 | Jones. |
| 3,506,071 | 4/1970 | Jones. |
| 3,536,136 | 10/1970 | Jones. |
| 3,613,786 | 10/1971 | Jones et al. |
| 3,613,787 | 10/1971 | Touch et al. |
| 3,882,940 | 5/1975 | Carlin. |
| 4,006,779 | 2/1977 | Kalfoglou. |
| 4,048,416 | 9/1977 | Axen et al. ............ 536/122 |
| 4,495,346 | 1/1985 | Anderson et al. ............ 536/4.1 |

OTHER PUBLICATIONS

Migrdichian, *Organic Chemistry*, pp. 77–78, 1957.
Helferich et al (Glucoside von Oxysulfonsauren und Oxyfulonsaureenstern, Emulsion XLV), Annalen der Chemie, vol. 547, pp. 201–215 (1941).
Liu et al, J. Am. Chem. Soc. (1982), vol. 104, p. 1178.
Soc. Pet. Tech., 186–194 (Feb. 1973).
Hakomori, J. Biochem. (Tokyo) (1964), vol. 55, p. 205.
J. Can. Petroleum Techn., 14(3) (1980), pp. 91–99.

*Primary Examiner*—Johnnie R. Brown
*Assistant Examiner*—Elli Peselev
*Attorney, Agent, or Firm*—William A. Simons; Thomas P. O'Day

[57] ABSTRACT

A sulfonated 1-O substituted glucoside having the formula:

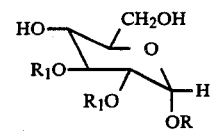

wherein:
(a) R is substituted or unsubstituted alkyl, aryl or aralkyl,
(b) one or both of the $R_1$ groups is either substituted or unsubstituted

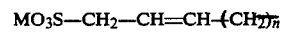

wherein M is H, a metal ion or ammonium, and n is an integer from 0 to 18, and
(c) any remaining $R_1$ group is H; useful as an oil recovery agent.

5 Claims, No Drawings

SULFONATED ALKYL GLUCOSIDES AND USE THEREOF IN OIL RECOVERY

BACKGROUND OF THE INVENTION

Heretofore, several polymeric or oligmeric carbohydrates such as cellulose and starch have been successfully sulfonated by the electrophilic addition thereto of sultones, epoxy-sulfonates and halogen-sulfonates in caustic solutions. Attempts to utilize these techniques to sulfonate a monomeric glucoside molecule such as methyl-α-D-glucoside resulted in the oligomerization or degradation of the molecule. Moreover, the strong hydrogen bonding of the four hydroxyl groups on the glucoside molecule prevents the nucleophilic substitution of the carbohydrate alcoholate or oxy-anion.

Helferich et al (Glucoside von Oxysulfonsauren Und Oxysulfonsaureenstern, Emulsin XLV, Annalen der Chemie, Vol. 547, pp. 201-215, 1941) succeeded in preparing sodium propyl-β-D-glucoside-γ-sulfonate utilizing a complicated five step procedure involving acetate protection/deprotection to form γ-chloro-propyl-β-D-glucoside from glucose and 1,3-dichloropropane, followed by chlorine displacement by iodine which required a second acetate protection/deprotection step. Finally, the end product was formed by iodine displacement in aqueous sodium sulfite. This complicated multistep procedure resulted in a low overall yield (~43%) and required the use of relatively expensive halogenating materials and involved, tedious purification methods. This procedure suffers from the additional disadvantage in that only the 1-O-substituted glucoside derivatives may be prepared thereby.

Those skilled in the art have labored under the assumption that this and similar expensive, time-consuming and inefficient methods were required to produce sulfonated methyl glucoside derivatives inasmuch as attempts to directly sulfonate the molecule always resulted in oligomerization and decomposition due to the acid sensitive acetal linkages in the glucoside molecule.

It is an object of the present invention to provide a simple, economical and efficient method for preparing sulfonated glucoside derivatives.

It is a further object of the invention to provide novel sulfonated glucoside derivatives useful as ionic-type surfactants.

It is still a further object of the present invention to provide a method for recovering petroleum from subterranean formations utilizing novel sulfonated glucoside derivatives.

SUMMARY OF THE INVENTION

According to the present invention there are provided novel sulfonated 1-O-substituted glucosides having the formula:

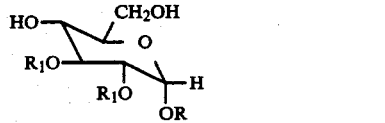

wherein:
(a) R is substituted or unsubstituted alkyl, aryl or aralkyl,
(b) one or both of the $R_1$ groups is either substituted or unsubstituted $$MO_3S—CH_2—CH=CH—(CH_2)_n$$

wherein M is H, a metal ion or ammonia, and
n is an integer from 0 to 18, and
(c) any remaining $R_1$ group is H.

The present invention also provides a method for the preparation of a 2-sulfonated or 2,3-disulfonated, 1-O-substituted glucoside derivative having the above formula comprising:

(a) reacting the 4— and 6—OH groups of a 1-O-substituted glucoside with a carbonyl group containing compound or an acetal thereof to form a cyclic acetal derivative of the glucoside so as to protect the 4- and 6-oxygen atoms from reaction in subsequent steps (b) and (c);

(b) reacting the cyclic acetal derivative with
  (1) a substantially equivalent amount of a metallating agent followed by condensation of the metallated product with a halide having the formula $hal(CH_2)_{n+1}—CH=CH_2$ or a substituted derivative thereof wherein n is an integer from 0 to 18 and hal is a halide according to the Williamson synthesis to form a substituted or unsubstituted 2-O-ether intermediate, or
  (2) in excess of an equivalent amount of a metallating agent followed by condensation of the metallated product with a halide having the formula $hal(CH_2)_{n+1}—CH=CH_2$ or a substituted derivative thereof wherein n is an integer from 0 to 18 and hal is a halide according to the Williamson synthesis to form a substituted or unsubstituted 2,3-O-di-ether intermediate; and (c) reacting either of the ether intermediates with a complex of sulfur trioxide and an electron donating organic compound at a temperature at or below about 0° C. thereby to form the 2-sulfonated [from step (b), (1)] or the 2,3-disulfonated [from step (b), (2)] 1-O-substituted glucoside derivative.

Finally, the present invention provides an improvement in methods for recovering petroleum from a subterranean, petroleum containing, porous formation penetrated by at least one injection well and at least one production well, the recovery method comprising the type wherein at least one fluid is injected into the formation via an injection well and petroleum displaced by the injected fluid is recovered from the formation through the production well. The improvement of the present invention resides in the utilization as the injected fluid a solution containing a sulfonated glucoside having the above formula (I).

DETAILED DESCRIPTION OF THE INVENTION

Sulfonated glucosides of the above formula are novel compounds possessing ionic surfactant properties. They are particularly useful in enhancing secondary oil recovery techniques. They are also useful as chelating agents or emulsifying agents.

Preferred among the sulfonated glucosides of the present invention are those having the formula:

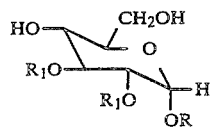

wherein:
(a) R is lower alkyl,
(b) one or both of the $R_1$ groups is

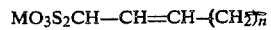

wherein M is H, a metal ion or ammonium and, n is an integer from 0 to 18 and
(c) any remaining $R_1$ group is H.

Particularly preferred among the sulfonated glucosides of the present invention are those having the formula:

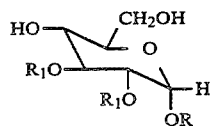

wherein:
(a) R is methyl,
(b) one or both of the $R_1$ groups is

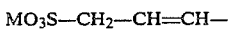

wherein M is an alkali metal, and
(c) any remaining $R_1$ group is H.

Most preferred among the sulfonated glucosides of the present invention is the compound of the above formula (III) wherein the 2—O—$R_1$ group is $NaO_3$S—$CH_2$—CH=CH— and the other $R_1$ group is H, e.g., sodium 1-O-methyl-2-O-propenyl-α-D-glucoside-γ-sulfonate.

R may be any substituted or unsubstituted alkyl, aryl or aralkyl group such as ethyl, propyl, butyl phenyl, benzyl or akloxyphenol.

Particularly preferred are the unsubstituted straight and branched chain lower alkyl groups or aryl groups such as methyl, ethyl, propyl, butyl, phenyl, and the like, with methyl being the most preferred group. It will be understood by those skilled in the art that R may be any group which is substantially inert with respect to the method of synthesis of the sulfonated glucoside.

Similarly, the substituents on said $R_1$ groups may be any which are inert with respect to the method of synthesis. Most preferred among the sulfonated glucosides of the present invention are those unsubstituted $R_1$ groups wherein n is 0.

The methods of the invention for preparing the above-described sulfonated glucosides may be represented by the following reaction scheme.

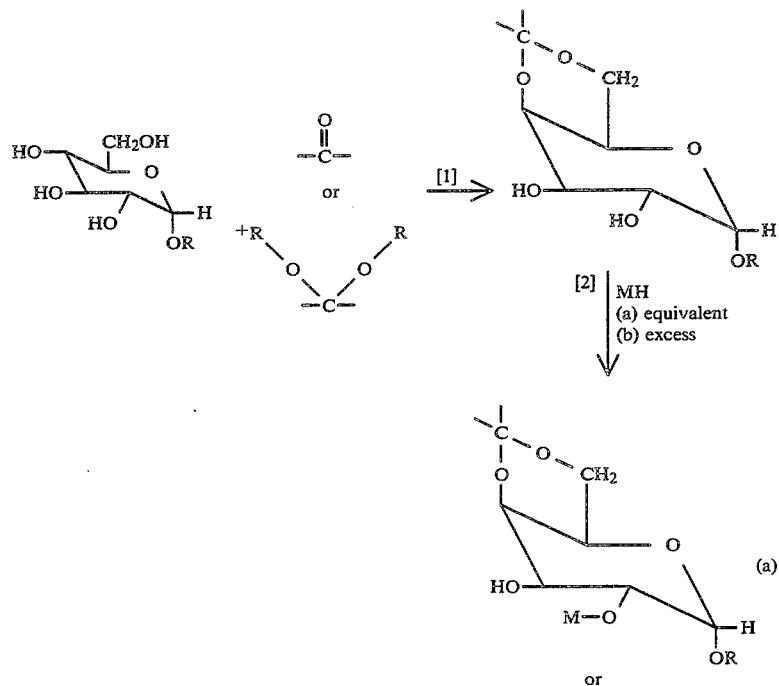

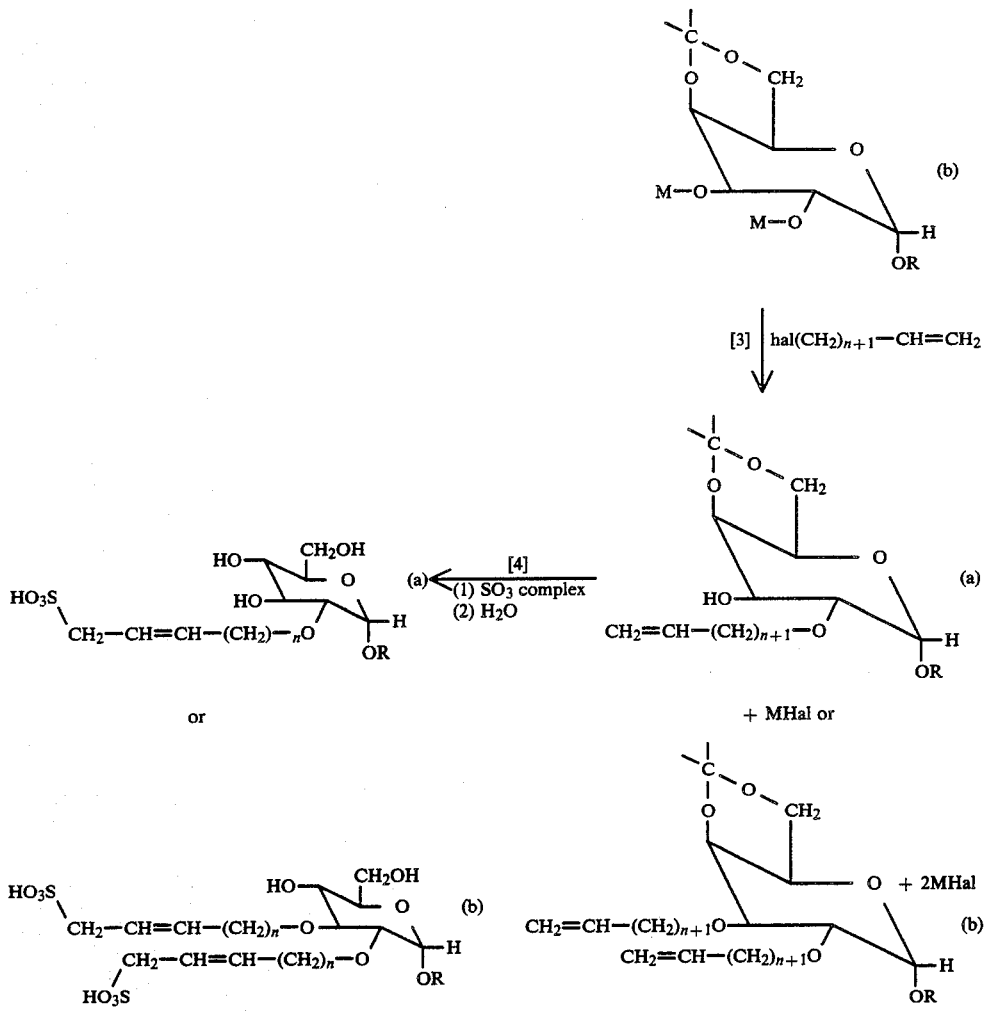

wherein R, M and n have the meanings set forth above and hal is a halide.

In step [1], any carbonyl group containing compound or acetal thereof capable of forming a cyclic acetal derivative of the starting 1-O-substituted glucoside at the 4 and 6 oxygen atoms may be employed. The carbonyl group containing compound or acetal must be one which does not react with or affect the other functional groups on the glucoside moiety and must form a cyclic acetal therewith which protects the 4- and 6-oxygen atoms from further reaction during steps [2], [3] and [4]. In addition, the cyclic acetal derivative must be one which is converted to the deprotected, i.e., 4—OH, 6—OH glucoside during step [4].

Those skilled in the art, having been exposed to the principles of the present invention, would be capable of determining suitable protective reagents without the exercise and undue experimentation or inventive faculties. Suitable such reagents include acetone, benzaldehyde, 2,2 dimethoxy propane, 2-methoxy propene, p-methoxyacetophenone dimethyl ketal, α-p-dimethoxy styrene or α,α-dimethoxy toluene.

Step [1] is preferably conducted in suitable inert solvent (e.g., dimethylformamide, dimethyl sulfoxide, ethylene glycol) in the presence of an acid catalyst (e.g., p-toluene sulfonic acid, pyridinium p-toluene sulfonate, at about room temperature. It will be understood by those skilled in the art that the above preferred reaction parameters may be altered depending upon the nature of the carbonyl reagent and the starting glucoside.

Step [2] comprises the first stage of a Williamson synthesis whereby the 4,6-O-cyclic acetal derivative produced according to step [1] is reacted with a suitable metallizing reagent to produce the metallated glucoside alcoholate. Any suitable metallizing reagent which does not deleteriously affect the remainder of the glucoside molecule and which forms a metal alcoholate group capable of undergoing the reaction in step [3] with the indicated halide may be employed. Those skilled in the art having been exposed to the principles of the present invention, would be capable of determining suitable metallizing agents without the exercise of undue experimentation or inventive faculties. Exemplary of such reagents are sodium hydride, sodium hydroxide or potassium hydroxide. The most preferred reagent, however, is the so-called dimsyl anion, i.e., sodium methylsulfinylmethide which may be prepared according to the method of Lin et al, J. Am. Chem. Soc., 1982, 104, 1178, the disclosure of which is incorporated herein by reference. The Lin et al method comprises reacting sodium hydride with dimethyl sulfoxide.

Where is it desired to produce the 2-O-sulfonated derivative, the cyclic acetal derivative produced by step [1] is reacted with three equivalent amounts of the metallating reagent. The metallating reagent reacts first and exclusively with the 2-oxygen atom until exhausted because it is known to contain the more acidic hydrogen.

Where it is desired to produce the 2,3-O-disulfonated derivative the cyclic acetal derivative is reacted with an excess of the metallating agent, whereby the 3-oxygen atom is also metallated after completion of the 2-O metallation step.

The metallation reaction of step [2] is preferably conducted at about room temperature in a suitable inert solvent (e.g., dimethyl sulfoxide, dimethyl formamide, and the like).

It will be understood by those skilled in the art, however, that the reaction parameters and choice of solvent, etc., may be varied widely depending upon the nature and type of the reactants.

The second stage of the Williamson synthesis, i.e., step [3], may be carried out in the same reaction medium produced by step [2]. There is no necessity for isolating the metallated alcoholate intermediate. Reaction of the latter with the appropriate halide (preferably chloride) will yield the glucoside ether intermediate. It is preferred to employ an excess of olefin halide and a slightly elevated temperature in order to drive the reaction to completion. It will be understood, however, by those skilled in the art that the process parameters may be varied in accordance with the classic Williamson synthesis and consistent with production of the mono- or di-ether of the glucoside derivative. The method is described in further detail by Hakomori, J. Biochem. (Tokyo), 1964, 55, 205, the disclosure of which is incorporated herein by reference.

Sulfonation of the ether intermediate, i.e., step [4], may be affected using any appropriate sulfonating agent which does not affect the remainder of the molecule. It is a unique feature of the present invention that sulfonation may be achieved utilizing a complex of sulfur trioxide and an electron donating organic compound such as 1,3-dioxane, DMSO, or thioxane, and the like. The complex is a mild sulfonating agent which effectively sulfonates the olefin moiety without decomposing or oligomerizing the glucoside molecule. The complex is formed by reacting sulfur trioxide with the organic compound at lowered temperatures in an inert solvent, such as 1,2-dichloroethane, carbon tetrachloride, and the like.

The sulfonation step is preferably conducted with an equivalent amount of sulfonating agent at lowered temperatures, i.e., at or below 0° C., in order to prevent oligomerization or decomposition of the glucoside. It is a further unique feature of the present invention that the sulfonation step also results in deprotection of the 4- and 6-oxygen atoms, i.e., deacetalization, thereby eliminating the necessity for conducting an additional step to produce the desired final product.

The sulfonated glucoside derivatives of the present invention may be substituted for any of the surfactants currently in use in the recovery of oil from subterranean, porous formations, i.e., secondary, tertiary and subsequent recovery schemes such as micellar flooding techniques, and the like, described, inter alia, in U.S. Pat. Nos. 3,468,377; 4,006,779; 3,882,940; 3,613,786; 3,613,787; 3,536,136; 3,506,070; 3,506,071; Soc. Pet. Tech., 186–194 (February 1973); Trans. AIME, 225; J. Can. Petroleum Techn., 14(3), 1980, pp. 91–99.

The invention is illustrated by the following non-limiting examples:

EXAMPLE 1

This example describes the preparation of sodium 1-O-methyl-2-O-propenyl-α-D-glucoside-γ-sulfonate.

(a) Preparation of methyl 4,6-O-isopropylidine-α-D-glucoside

The 4,6-O-isopropylidine derivative of methyl-α-D-glucoside is prepared by an acid catalyzed acetal exchange reaction with 2,2-dimethoxypropane. A three-neck-round-bottom flask is fitted with a mechanical stirrer and a calcium chloride drying tube and charged with dry DMF (1.87 moles), 2,2-dimethoxypropane (0.21 moles), and p-toluene-sulfonic acid (0.0013 moles). Dried methyl-α-D-glucoside (0.10 moles) (MEG) is added to the solution while stirring. The glucoside dissolves within a few minutes. The mixture is stirred for 24 hours at room temperature. The reaction mixture is neutralized by shaking with excess Rexyn AG1 (OH−) resin in methanol for 2 hours. The acidified resin is vacuum filtered. The filtrate is diluted with water (100 mL). A liquid-liquid extraction apparatus is set up and the diluted filtrate extracted with hexane for 2 hours. The diacetal derivative of MEG is retained in the organic portion. (Graded acid hydrolysis of the diacetal to the monoacetal can be performed with glacial acetic acid, if desired). The aqueous phase is concentrated by roto-evaporation using a vacuum pump. The water-bath temperature is maintained below 40° C. The wet-colorless-syrupy residue is dried with xylene using two successive evaporations of equal portions. The dried residue is triturated in boiling dichloromethane leaving a residue of MEG. The dichloromethane extract is concentrated on a roto-evaporator. The solid which remains is the 4,6-O-acetal. Unmaximized yield 68%, m.p. 82°–83.5° C.

(b) Preparation of sodium methylsulfinylmethide (dimsyl anion)

Sodium hydride is directly combined with dimethyl sulfoxide (DMSO) under a nitrogen atmosphere producing an equivalent amount of base, dimsyl anion, and hydrogen gas as illustrated in the equation:

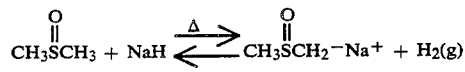

Two clean, three-neck, round-bottom flasks, a reflux condensor, two stainless-steel 16 gauge canibises, two syringe needles and two syringes are dried in an oven overnight. The warm reaction-apparatus is assembled under a flow of nitrogen in the fume-hood. The apparatus is cooled to ambient temperature. The dry-three-neck-flask fitted with a rubber septum to the two side arms, a glass-stopper and a magnetic stirring bar is tared and the weight recorded. The center glass stopper is removed and NaH coated with mineral oil is weighed in. The amount of base is calculated as three times the number of free hydroxyl groups per sugar unit of the glucoside reactant. The stopper is replaced and the tared flask weighed with its contents to ascertain the amount of NaH added. The flask is replaced in the hood and a stream of nitrogen allowed to flow through. The NaH is washed free of mineral oil with anhydrous ether by syringing 5 ml into the flask. The stirrer is actuated for three minutes. NaH is allowed to settle and the ether decanted off using a syringe. The stopper is replaced with a reflux condensor. The nitrogen source is then removed. The residual ether is evaporated using a water-aspirator-vacuum source which is substituted for the $N_2$ outlet of the apparatus. The evacuated reaction system is then re-gassed with nitrogen. DMSO is syringed into the reaction flask. The ensuing condensation reaction is exothermic and is cooled in an ice-bath. The final dimsyl-anion concentration is about 3.0 meq/ml. The resulting heterogeneous mixture is heated and stirred in an oil-bath at 50°-60° C. until the solution becomes green and the evolution of hydrogen gas ceases. The reaction mixture is then cooled to ambient temperature.

(c) Preparation of sodium glucoside alcoholate

The sodium glucoside alcoholate is prepared according to the equation:

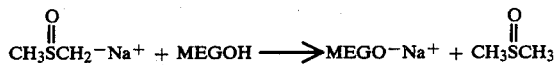

The second empty, dry, three-neck, round-bottom flask is charged with the glucoside derivative of step (a) and dry DMSO to make a 0.71 molar solution. The resulting carbohydrate solution is cooled in an ice-bath The freshly prepared dimsyl-anion solution of Example 1(b) is transferred to the carbohydrate solution with stirring. The ice-bath is removed if the reaction mixture becomes too difficult to stir. The reaction mixture is stirred at room temperature or below overnight.

(d) Alkenylation of glucoside

Allyl chloride (5 equivalents per glucoside moiety) is added to the reaction mixture of step (c) while maintaining the reaction temperature at about 50° C. and allowed to react for about two hours. The mixture is then allowed to attain room temperature and is poured into ice water. The resulting solution is extracted three times in a separatory funnel with equal portions of $CH_2Cl_2$. The organic layer is dried over anhydrous $MgSO_4$ and concentrated at below 40° C. by roto-evaporation. The syrupy oil product is purified by silica-gel chromatography. The product is recrystallized from 95% ethanol and washed with hexane. (80% yield)

(e) Preparation of $SO_3$ complex

A flask is charged with 0.154 mole dioxane and 150 ml 1,2-dichloroethane under nitrogen and stirred mechanically. Nitrogen is charged into the flask and the contents cooled to $-10°$ C. in an ice-salt bath. $SO_3$ is added dropwise to the flask and the reaction mixture maintained at 0° C. White flakes of $SO_3.OC_4H_8O$ complex immediately precipitate from the mixture. The resulting suspension is stirred for 30 min. at 0° C. to complete the reaction.

(f) Sulfonation

The product of step (d) dissolved in 1,2-dichloroethane is rapidly added to the solution of step (e) with stirring. The reaction temperature is maintained below 10° C. The colorless solid turns to a golden-brown homogeneous mixture. After 3 hours reaction time, the cooling bath is removed. The reaction mixture is continuously stirred at room temperature for an additional hour. The dark-brown solution is added to ice-water and stirred or shaken to mix the organic sulfonic acids in the water phase. The resulting emulsion is neutralized with 0.1N NaOH using methyl red as an indicator (pH 4.4→6.2, red to yellow) and the layers separated. The aqueous layer is extracted with ether and the organic portions combined. The aqueous layer is concentrated by high vacuum roto-evaporation at 40°. Any inorganic salts from the syrupy aqueous residue are extracted by washing with acetone and the precipitate vacuum filtered. The syrupy acetone filtrate is purified by silica-gel column chromatography.

The reactions may be summarized according to the following scheme:

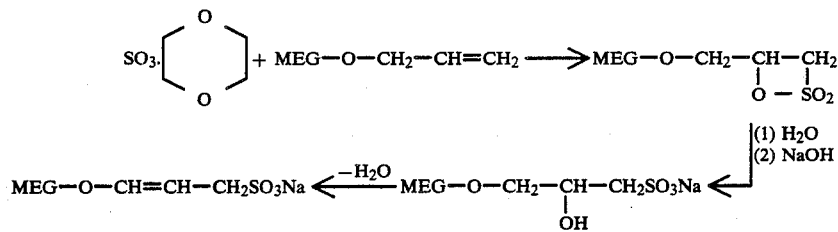

The sultone intermediate is decomposed in water to form the organic sulfonic acid. Base neutralization produces the corresponding sulfonate salt. Low reaction and neutralization temperatures (10° C.) favor formation of the hydroxy-sulfonates; however, they are difficult to isolate, eliminating water readily to form the alkene sulfonates.

A major characteristic property of sodium methyl 2-O-propenyl-α-D-glucoside-γ-sulfonate is its hydrophilicity. It is readily soluble in water and alcoholic solvents and insoluble in non-polar solvents. It is a golden brown crystalline solid that melts around 205° C. rendering it highly heat stable. It possesses surfactant-like properties and exhibits a surface tension of 42.0 dynes/cm at 0.1% concentration and decreases the interfacial tension of mineral oil and water (6.4 dynes/cm at 3% concentration).

EXAMPLE 2

This example illustrates the value of the product of Example 1 in secondary methods for recovering oil.

The product of Example 1 exhibits a higher percentage oil-recovery when compared against other commercial agents (Table I). The experimental test method employed a vertical sand column saturated with mineral oil and flushed with a brine solution followed by a 1% surfactant solution. The procedure was repeated eight or more times. Although the standard deviation values are relatively high, the different oil recovery performance values are statistically significant (95% confidence level). Since 21% more oil was recovered using sulfonated methyl glucoside, its use as an enhanced oil recovery agent is apparent.

TABLE I

| Sacrificial Agent | % Oil Recovery ± Standard Deviation | Number of Trials, n |
|---|---|---|
| REAX 88B | 14.16 ± 3.76[1] | 9 |
| Lignosol DXD | 9.99 ± 7.24[1] | 9 |
| Marasperse N-22 | 13.74 ± 7.09 | 8 |
| Sulfonated MEG | 21.86 ± 5.79 | 8 |

[1] Values determined by the sand column method using Ottawa sand in place of Mallinckrodt sand which has a finer mesh size.

I claim:

1. A sulfonated 1-O substituted glucoside having the formula:

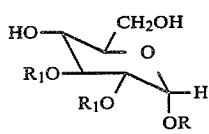

wherein:
 (a) R is lower alkyl, phenyl, benzyl or alkoxyphenol;
 (b) one or both of said $R_1$ groups is

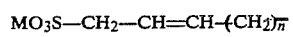

$MO_3S-CH_2-CH=CH-(CH_2)_n-$ wherein M is H, an alkali metal ion or ammonium, and n is an integer from 0 to 18; and (c) any remaining $R_1$ group is H.

2. A sulfonated 1-O-substituted glucoside according to claim 1 having the formula:

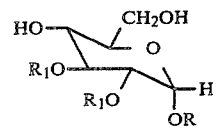

wherein:
 (a) R is lower alkyl,
 (b) one or both of said $R_1$ groups is

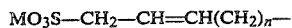

$MO_3S-CH_2-CH=CH(CH_2)_n-$ wherein M is H, an alkali metal ion or ammonium, and n is an integer from 0 to 18, and (c) any remaining $R_1$ group is H.

3. A sulfonated 1-O-substituted glucoside according to claim 2 having the formula:

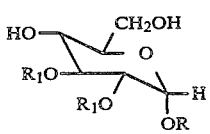

wherein:
 (a) R is methyl,
 (b) one or both of said $R_1$ groups is

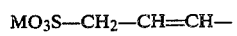

$MO_3S-CH_2-CH=CH-$ wherein M is an alkali metal, and (c) any remaining $R_1$ group is H.

4. The compound sodium 1-O-methyl-2-O-propenyl-α-D-glucoside-γ-sulfonate.

5. In a method for recovering petroleum from a subterranean, petroleum containing, porous formation penetrated by at least one injection well and at least one production well, said recovery method comprising the type wherein at least one fluid is injected into the formation and petroleum displaced by the injected at least one fluid is recovered from the formation through the production well, the improvement wherein at least one fluid injected into said formation is a sulfonated glucoside derivative according to claim 1.

* * * * *